US012771268B2

(12) United States Patent
Suzuki

(10) Patent No.: US 12,771,268 B2
(45) Date of Patent: Oct. 20, 2026

(54) FIELD MAGNET POSITION DETECTION METHOD FOR ELECTRIC MOTOR

(71) Applicant: SHINANO KENSHI KABUSHIKI KAISHA, Nagano (JP)

(72) Inventor: Kazuteru Suzuki, Nagano (JP)

(73) Assignee: SHINANO KENSHI KABUSHIKI KAISHA, Nagano (JP)

( * ) Notice: Subject to any disclaimer, the term of this patent is extended or adjusted under 35 U.S.C. 154(b) by 184 days.

(21) Appl. No.: 18/938,499

(22) Filed: Nov. 6, 2024

(65) Prior Publication Data

US 2025/0219557 A1 Jul. 3, 2025

(30) Foreign Application Priority Data

Dec. 28, 2023 (JP) ................................ 2023-222756

(51) Int. Cl.
*H02P 6/15* (2016.01)
*H02P 6/18* (2016.01)

(52) U.S. Cl.
CPC ...................................... *H02P 6/18* (2013.01)

(58) Field of Classification Search
CPC ............. H02P 6/153; H02P 6/18; H02P 6/181
See application file for complete search history.

(56) References Cited

U.S. PATENT DOCUMENTS

| | | | | |
|---|---|---|---|---|
| 6,424,798 | B1 * | 7/2002 | Kitamine | H02P 6/18 318/400.26 |
| 10,855,212 | B2 | 12/2020 | Yamamoto | |
| 2013/0002178 | A1 * | 1/2013 | Endou | H02P 6/153 318/400.11 |
| 2020/0136536 | A1 * | 4/2020 | Yamamoto | H02P 6/181 |

* cited by examiner

*Primary Examiner* — Cortez M Cook
(74) *Attorney, Agent, or Firm* — Stephen J. Weyer, Esq.; Stites & Harbison, PLLC

(57) ABSTRACT

When a three-phase brushless motor is operated by sensorless driving under PWM control with 120-degree energization, an operation can be performed with a field magnet position of an electric motor operating reliably detected even when a duty ratio of driving voltage is varied. When performing an operation with a duty ratio of driving voltage applied to a three-phase coil varied through an invertor circuit (52), an MPU (51) selects an optimum duty ratio for sensing non-energization phase coil voltage for predetermined driving voltage, applies the driving voltage in an on-duty interval corresponding to the optimum duty ratio when the driving is performed with the optimum duty ratio, and when applying the driving voltage based on a duty ratio higher than the optimum duty ratio, applies the driving voltage with an on-duty interval of a single cycle divided into a plurality of on-duty intervals including the optimum duty ratio.

2 Claims, 10 Drawing Sheets

FIELD MAGNET POSITION DETECTION METHOD FOR ELECTRIC MOTOR

CROSS-REFERENCE TO RELATED APPLICATION

This application is based upon and claims the benefit of priority of the prior Japanese Patent Application No. 2023-222756, filed on Dec. 28, 2023, and the entire contents of which are incorporated herein by reference.

TECHNICAL FIELD

The present invention relates to a field magnet position detection method for an electric motor performed when the electric motor is driven at a low speed under sensorless driving.

BACKGROUND ART

DC motors having brushes have been conventionally used as small DC motors, but have problems in terms of brush sound, electrical noise, durability, and the like. Thus, brushless DC motors have been developed. In recent years, sensorless motors with no position sensor have attracted attention for reduction in size and cost, increase in durability, and the like. The sensorless motors have been first employed in a field of information devices such as hard disk drive, and are now starting to be employed in fields of home appliances and in-vehicle equipment due to the development of vector control technique.

Under sensorless driving, a rotor position is detected based on induced voltage. This means that activation is unattainable in a stopped state where no induced voltage is produced and thus the rotor position is unidentifiable. A method available for detecting the rotor position in the stopped state includes, with a coil current sensor and a current detection circuit provided, estimating the position based on a current response obtained from a coil current of sine wave form made to flow under PWM driving using an inverter.

The rotor position in the stopped state can be detected from an inductance difference using a method as represented by the method as described above. Alternatively, the rotor may be rotated by forced commutation to determine the position without position sensing.

Unfortunately, once the activation starts, energization for rotation occurs, and thus it becomes difficult to implement the method of providing sensing pulses and detecting the rotor position from the inductance difference. The inductance difference may be detected with high frequency current superimposed on excitation current for example, but this requires large scale hardware and software. On top of that, an impact of magnetic saturation and induced voltage needs to be taken into consideration. Furthermore, there are factors difficult to estimate such as inherent error of a motor and a driving circuit. In view of this, a ramp start method has been widely employed in which no position detection is performed, and a rotor is forcibly positioned by fixed excitation and the rotation is gradually increased in synchronization. Unfortunately, the method involves problems of a long time required for positioning the rotor and reverse rotation. Furthermore, since the open loop control is employed for the synchronization, there are disadvantages such as a long time required for acceleration and a high risk of desynchronization due to a change in load. To overcome such disadvantages, the activation is achieved with high current, resulting in compromised efficiency and a larger DC power source. Furthermore, the application is limited due to desynchronization caused by a change in load. Specifically, the method is unavailable for applications involving rotation by reciprocating mechanism or external force, and applications involving viscous load and varying load, and the like.

In view of the above, as a field magnet position detection method with which the rotor position can be detected in units of excitation interval in 120-degree energization, while achieving a cost reduction with simple hardware and software without producing sensing sound at the time of activation, there has been proposed a method (PTL 1: JP-A-2019-17235) of detecting a position of a rotor utilizing a change in induced voltage produced in a non-energized phase based on a position of a permanent magnet field system (rotor), as a result of applying voltage to a three-phase brushless motor during 120-degree energization driving of the motor.

SUMMARY OF INVENTION

Technical Problem

Unfortunately, when a motor is energized by the 120-degree energization, the induced voltage produced in the non-energization phase varies depending on a value of the driving voltage applied to the motor. Particularly in the case of PWM driving, the induced voltage varies depending on the value of the duty ratio of the applied voltage (energization time).

FIG. 12 is a graph illustrating the variation of the induced voltage produced in the non-energization phase for each duty ratio of a motor, in accordance with a rotation position of a rotor. From the graph, it can be understood that the value of the induced voltage produced varies largely depending on the value of the duty ratio.

FIG. 13 illustrates an example of a driving voltage waveform diagram in a case where the duty ratio in the PWM driving varies. In a case of the motor illustrated in FIG. 12, the change in the induced voltage on the positive side and the negative side occurring in the non-energized phase is obvious and easily measurable when the duty ratio is 20%. However, with other duty ratios, the level of the induced voltage is low, resulting in a slight change in the voltage which is difficult to measure.

PTL 1 proposes a method of avoiding such a situation through multiplication of a correction factor in accordance with the duty ratio. However, depending on the motor, even when the induced voltage is multiplied by the correction factor, the position detection is difficult if the duty level is lower than a certain level or higher than a certain level. Thus, only the duty ratios in a limited range are available. This leads to limitation in the controllable range of the motor torque, meaning that the target rotation speed and torque of the electric motor cannot be achieved.

Solution to Problem

The present invention is made for solving such problems, and an object of the present invention is to provide a field magnet position detection method for an electric motor with which when a three-phase brushless motor operates at a low speed under sensorless driving by PWM control with 120-degree energization, the low speed operation can be achieved with the field magnet position of the electric motor reliably detected, even when the duty ratio of the driving voltage changes.

A field magnet position detection method for an electric motor including a rotor including a permanent magnet field system, a stator including a three-phase coil, an output unit configured to perform bidirectional energization on the three-phase coil via a half bridge type invertor circuit, a control unit configured to perform PWM control on a coil output in response to an instruction from a host controller, store energization angle information and energization pattern information in units of 60° energization interval in which continuous rotation is attainable, and switch an energization state by performing switching control on the output unit based on the information, and a measurement unit configured to perform A/D conversion on the three-phase coil voltage and transmit resultant voltage to the control unit, the method comprising, using the electric motor and by the control unit: performing 120-degree energization including an off cycle periodically in an energization pattern in which a point of self-excited stop occurring with two-phase fixed energization through the output unit matches a start point position of the 60° energization interval; and performing sensorless driving while detecting a field magnet position of the electric motor by measuring energization phase voltage and non-energization phase voltage in an on cycle of the PWM energization with the measurement unit, wherein the control unit selects an optimum duty ratio for sensing the non-energized phase coil voltage during the on-duty period and operates by varying the duty ratio of the predetermined drive voltage applied to the three-phase coil through the output unit, and when driving with the optimum duty ratio during a current conduction period of one cycle, the predetermined drive voltage is applied through the output unit during the on-duty period of the optimum duty ratio, and when driving with a duty ratio exceeding the optimum duty ratio during a current conduction period of one cycle, the predetermined drive voltage is applied through the on-duty period of one cycle dividing into a plurality of on-duty periods including the optimum duty ratio.

A field magnet position detection method for an electric motor including a rotor including a permanent magnet field system, a stator including a three-phase coil, an output unit configured to perform bidirectional energization on the three-phase coil via a half bridge type invertor circuit, a control unit configured to perform PWM control on a coil output in response to an instruction from a host controller, store energization angle information and energization pattern information in units of 60° energization interval in which continuous rotation is attainable, and switch an energization state by performing switching control on the output unit based on the information, and a measurement unit configured to perform A/D conversion on the three-phase coil voltage and transmit resultant voltage to the control unit, the method comprising, using the electric motor and by the control unit: performing 120-degree energization including an off cycle periodically in an energization pattern in which a point of self-excited stop occurring with two-phase fixed energization through the output unit matches a start point position of the 60° energization interval; and performing sensorless driving while detecting a field magnet position of the electric motor by measuring energization phase voltage and non-energization phase voltage in an on cycle of the PWM energization with the measurement unit, wherein the control unit selects an optimal duty ratio for sensing the non-energized phase coil voltage during the on-duty period and operates by varying the duty ratio of the predetermined drive voltage applied to the three-phase coil through the output unit, and when driving with the optimal duty ratio during the energization period of one cycle, applies the predetermined drive voltage during the on-duty period of the optimal duty ratio, and when driving with a non-exceed the optimal duty ratio during the energization period of one cycle, applies the predetermined drive voltage during extends the time of the energization period of one cycle or during multiple cycles including the optimal duty ratio.

As described above, in a case of varying a duty ratio of driving voltage for PWM energization on a three-phase coil of an electric motor driven by sensorless driving, when the driving is implemented with the optimum duty ratio in an energization interval of a single cycle, the driving voltage is applied in the on-duty interval corresponding to the optimum duty ratio, when driving voltage based on a duty ratio higher than the optimum duty ratio is applied, the driving voltage is applied with an on-duty interval of a single cycle divided into a plurality of on-duty intervals including the optimum duty ratio, and when driving voltage based on a duty ratio not higher than the optimum duty ratio is applied, the driving voltage including the optimum duty ratio is applied in a single cycle with an extended duration or in a plurality of cycles.

With this configuration, when varying the duty ratio of the driving voltage for the PWM energization on the three-phase coil of the electric motor driven by the sensorless driving, a field magnet position of the electric motor can be detected in a low-speed driving period from non-energization phase coil voltage through application of driving voltage based at least on an optimum duty ratio even if selecting any of controllable duty ratios. Thus, the electric motor can be smoothly operated continuously at a low speed.

Advantageous Effects of Invention

A field magnet position detection method for an electric motor can be provided with which when a sensorless low-speed operation is performed with PWM control performed on the electric motor with the 120-degree energization, the low-speed operation can be performed with a field magnet position of the electric motor reliably detected even when the energization is performed with a duty ratio varied.

DESCRIPTION OF EMBODIMENTS

An embodiment of a field magnet position detection method for an electric motor according to the present invention will be described below with reference to the attached drawings. A description of the invention of the present application will be given using, as an example of an electric motor, a sensorless motor including a rotor including a permanent magnet field system, and having star connected coils provided to the stator with a 120° phase difference. Phase ends are connected to a motor output unit.

Figure 9:
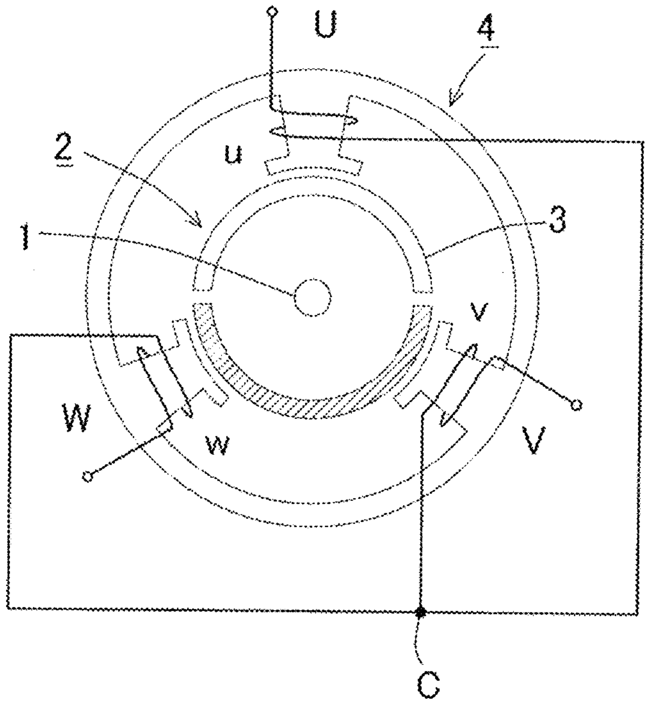
FIG. 9 is a configuration diagram of the three-phase DC brushless motor in star connection.

In the following, as an example, a permanent magnet field magnet position detection method for a sensorless motor for sensorless driving of a three-phase DC brushless motor will be described together with a configuration of a sensorless motor driving device. With reference to FIG. 9, an example of a three-phase brushless DC motor according to the present invention is illustrated. As an example, a three-phase brushless DC motor including a two-pole permanent magnet rotor and a stator 4 with three slots is exemplarily illustrated. The motor may be any of an inner rotor type or an outer rotor type. The permanent magnet type field system may be any of an interior permanent magnet (IPM) motor and a surface permanent magnet (SPM) motor.

In FIG. 9, a rotor shaft 1 is integrally provided with a rotor 2, and a two-pole permanent magnet 3 is provided as a field magnet. In the stator 4, pole teeth U, V, and W are provided with a 120° phase difference and face the permanent magnet 3. The three-phase brushless DC has the pole teeth U, V, and W of the stator 4 respectively provided with coils u, v, and w, with the star connection established between phases at common C. The coils are connected with a motor driving device described below. Note that the common line is not required, and thus is omitted.

Figure 8:
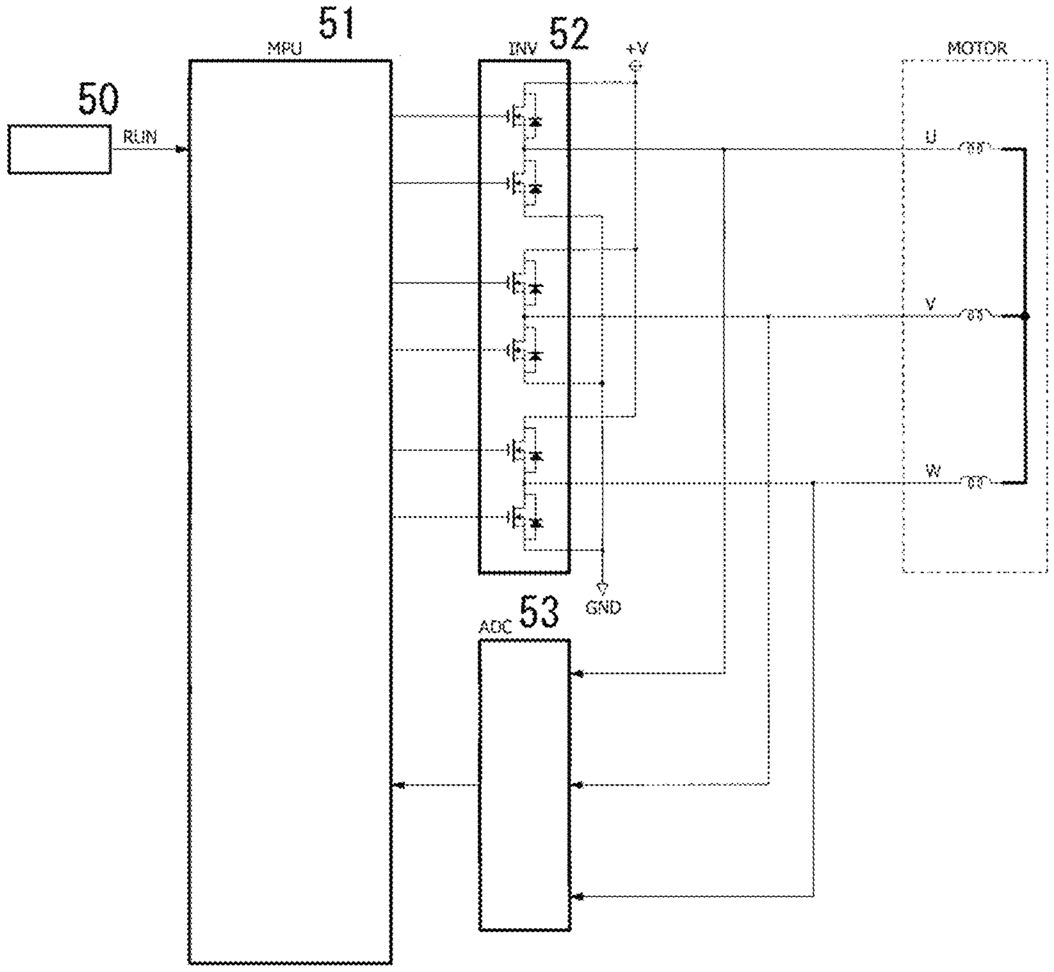
FIG. 8 is a block configuration diagram of a driving circuit of a three-phase DC brushless motor.

FIG. 8 illustrates an example of a driving circuit for the three-phase DC brushless motor.

It is assumed that 120-degree energization bipolar square wave excitation is employed as a driving method at the time of activation. MOTOR stands for a three-phase sensorless motor. MPU 51 stands for a microcontroller (control unit). The MPU 51 stores six energization patterns for the three-phase coils (U, V, W) as well as field magnet position information designating an excitation switching interval (interval 1 to interval 6) for 120-degree energization corresponding to each of the energization patterns, and performs the switching control for an output unit in accordance with a rotation instruction RUN from a host controller 50 to switch the excitation state as desired.

An invertor circuit 52 (INV: output unit) energizes the three-phase coil, and performs a switching operation such as excitation phase switching or PWM control for controlling the motor torque. The invertor circuit 52 includes a diode connected in inverse parallel with a switching element, and a half bridge type switching circuit for three phases is provided that can be connected to a positive power supply line and a ground power supply line as desired.

An A/D conversion circuit 53 (ADC: measurement unit) is connected with coil output terminals U, V, and W, simultaneously samples the coil voltages for the three respective phases in response to a conversion start signal from the MPU 51, sequentially performs analog-to-digital conversion, and transmits the conversion result to the MPU 51. Generally, the ADC 53 is incorporated in the MPU 51. When the ADC 53 thus incorporated is used, a voltage divider circuit with resistor is preferably provided due to a low maximum input voltage. Thus, with the configuration, the driving circuit can be extremely simply configured.

It has been known that an inductance change (spatial harmonics) based on a rotor angle θ is approximately by $\Delta L = -\cos(2\theta)$, and that there are two cycles per electric angle. On the other hand, it has been known that a two-cycle voltage variation with a neutral point potential at the center is observed in the non-energization phase depending on θ, as a result of two-phase energization through square wave PWM energization on the three-phase coil.

Figure 1:
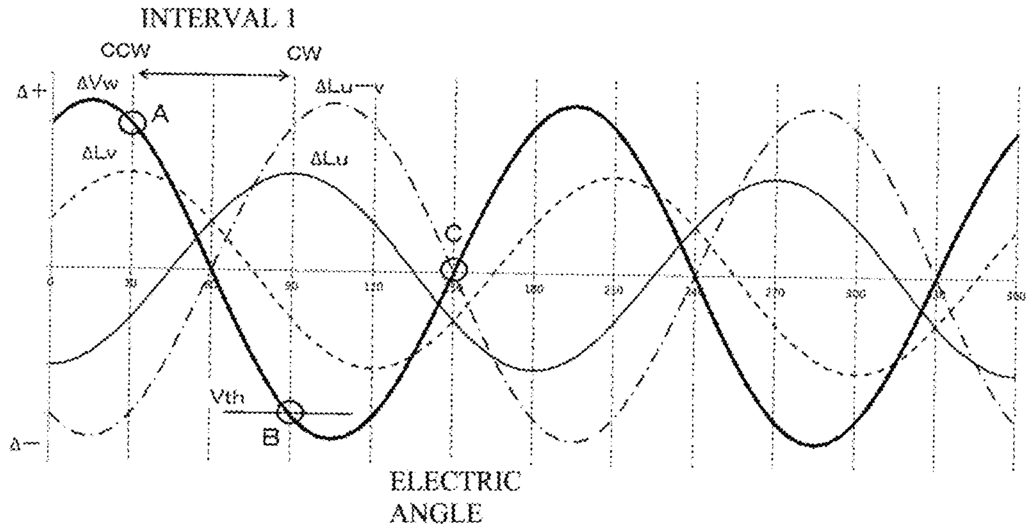
FIG. 1 is a waveform diagram of inductance and non-energization phase coil voltage at the time of U-V excitation.

FIG. 1 illustrates a voltage change waveform ΔVw in the non-energization phase, as well as a theoretical value waveform of U-phase and V-phase inductance changes (ΔLu, ΔLv) and a combined inductance change ΔLu-v of the two phases, in a case of rotation by one electric angle under U-V excitation by the PWM energization. The voltage change waveform is assumed to be obtained by inverting the polarity of the combined inductance change waveform, and is assumed to swing above and below the neutral point potential at ½ of the coil applied voltage.

Figure 7A:
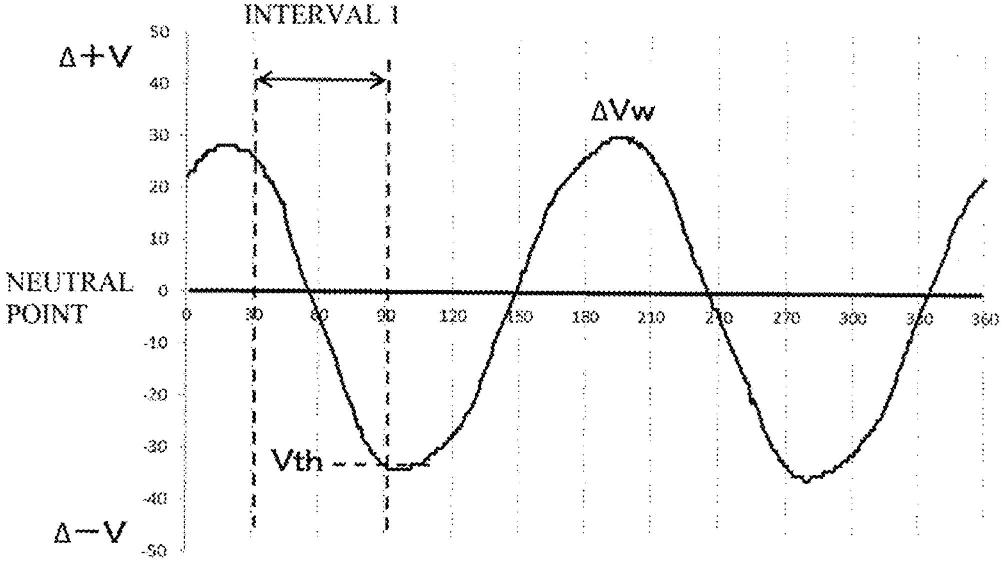
FIGS. 7A and 7B are waveform diagrams of actually measured non-energization phase coil voltage.

FIG. 7A illustrates a waveform of non-energization phase coil voltage actually measured using an inner rotor-type motor. The theoretical values of the voltage waveform in the non-energization phase are assumed to be of inversed polarities reflecting the inductance. The waveforms are substantially approximated, and thus it can be understood that the assumption holds true. In the case of square wave energization, ringing occurs in the induced voltage. Still, a result of the actual measurement indicates that in various motors, the ringing only lasts for an extremely short period of time, specifically, several microseconds to several tens of microseconds, which is within a range of measurement error. This means that the induced voltage can be accurately detected, even when the square wave PWM energization pulse for motor driving is used.

When a large current flows in the three-phase coil, magnetic saturation occurs, resulting in no change in the inductance. This is particularly eminent in an outer rotor-type motor with a small size. When the magnetic saturation occurs, the two-cycle inductance change waveform turns into a single cycle form. Specifically, a peak and a bottom adjacent to a setup position at which self-excited stop occurs with the two-phase fixed energization remain, but the other peak and bottom disappear.

Figure 7B:
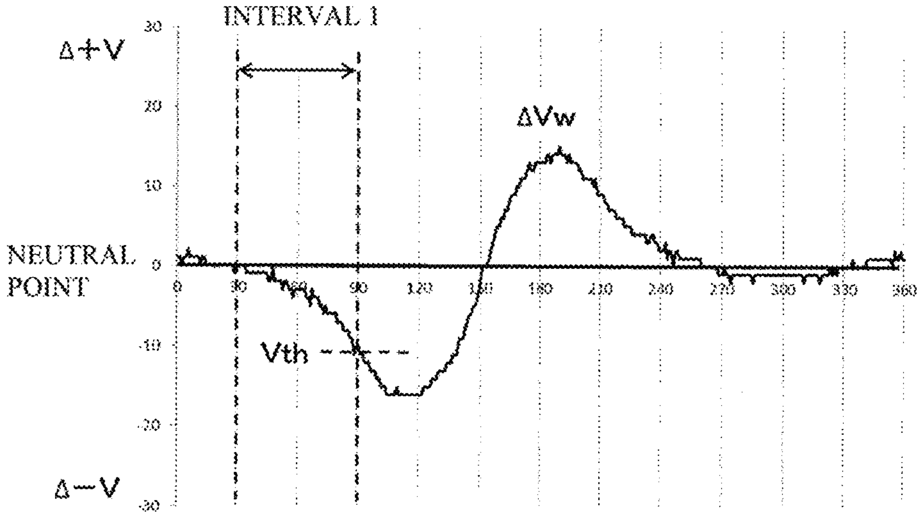

FIG. 7B illustrates an example of the single-cycle inductance waveform as a result of the magnetic saturation. The motor used for the measurement is an outer rotor-type motor with a small size, which is different from the motor used in FIG. 7A. The setup position at the time of U-V energization is 150°, and only the peak and the bottom adjacent to the setup position are clearly observed in a ΔVw waveform.

The setup position at which the self-excitation stop occurs with the two-phase fixed energization is an inductance zero-crossing point and is also an induced voltage zero-crossing point. The setup point as well as the adjacent peak and bottom are stable even when the magnetic saturation occurs.

As can be seen in FIG. 7A and FIG. 7B, the voltage variation in the non-energization phase reflects the rotor angle θ, and monotony is guaranteed within the interval. Thus, in the stopped state, even when the induced voltage is not produced, the rotor position can be estimated by making the excitation current flow. The variation in voltage occurs to be in a range of 10% or more of the voltage applied to the coil, which could be in order of several volts. This is extremely advantageous considering that in the conventional method, the induced voltage in order of millivolts is detected at the time of activation.

As described above, the inductance change of the non-energization phase coil voltage is detected using the square wave PWM control for motor driving, and only the inductance change in the vicinity of the setup position is used so that the position can be detected stably from the stopped state to the low-speed rotation range. Thus, the sensing procedure is simplified, and the efficiency is improved without the need for electricity for the sensing. Furthermore, no sensing noise occurs, whereby noise reduction is achieved.

The angles and the energization patterns for each energization interval of the 120-degree energization are listed in the following table. In the table, CW energization is an energization pattern with rotation occurring in a direction in which the angle increases, and CCW energization is an energization pattern with rotation occurring in a direction in which the angle decreases. Setup energization is an energization pattern in which self-excited stop occurs at an angle written in parenthesis in the frame of the table. For this pattern, both the start point and the end point are written for each interval. For each energization pattern, a phase connected to the positive power supply side and a phase connected to the GND side are respectively written before and after the hyphen.

TABLE 1

Interval angle and energization pattern

| Interval number | Interval angle | CW energization | CCW energization | Setup energization |
|---|---|---|---|---|
| 1 | 30° to 90° | U-V | V-U | W-U (30°)<br>W-V (90°) |
| 2 | 90° to 150° | U-W | W-U | W-V (90°)<br>U-V (150°) |
| 3 | 150° to 210° | V-W | W-V | U-V (150°)<br>U-W (210°) |
| 4 | 210° to 270° | V-U | U-V | U-W (210°)<br>V-W (270°) |
| 5 | 270° to 330° | W-U | U-W | V-W (270°)<br>V-U (330°) |
| 6 | 330° to 30° | W-V | V-W | V-U (330°)<br>W-U (30°) |

Here, CW indicates the rotation direction in which the interval number written in Table 1 increases, and CCW indicates the rotation direction in which the interval number decreases. The interval end point position is a boundary point for the adjacent + side interval at the time of CW direction rotation, and for the − side interval at the time of CCW direction rotation. For example, in a case of interval 1, the point is a boundary point 90° for interval 2 at the time of CW direction rotation, and is a boundary point 30° for interval 6 at the time of CCW direction rotation.

In FIG. 1, A point and B point illustrated correspond to the energization interval start point and the energization interval end point at the time of CW direction rotation in U-V excitation, respectively. The setup point is C point, and the bottom portion, including the B point, in which the phase is stable can be used for the position detection. Thus, a threshold Vth on the positive side and the negative side with a predetermined potential difference from the neutral point potential is set in advance. For each measurement, the non-energization phase coil voltage ΔVw is compared with the threshold Vth, and it is possible to detect that the interval end point is exceeded when the threshold is exceeded.

Figure 4:
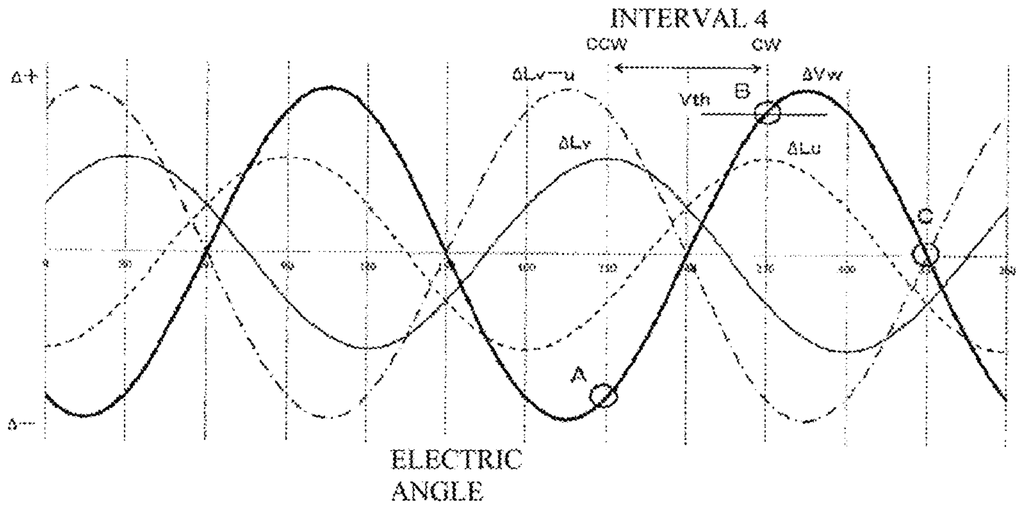
FIG. 4 is a waveform diagram of inductance and non-energization phase coil voltage at the time of V-U excitation.

Reference is made to FIG. 4, since the V-U energization is implemented at the time of CCW direction rotation. The rotor rotates from the electric angle 90° side toward the electric angle 30° side. Thus, the electric angle 30° is the interval end point. Since the setup point is at the electric angle 330°, the bottom portion on the electric angle 30° side has the phase stabilized and can be used for the position detection. Thus, as in the case of CW, the interval end point can be detected through the comparison between the voltage in the non-energization phase W and the threshold Vth.

The U-W energization is selected for interval 2 from electric angle 90° to electric angle 150°.

Figure 2:
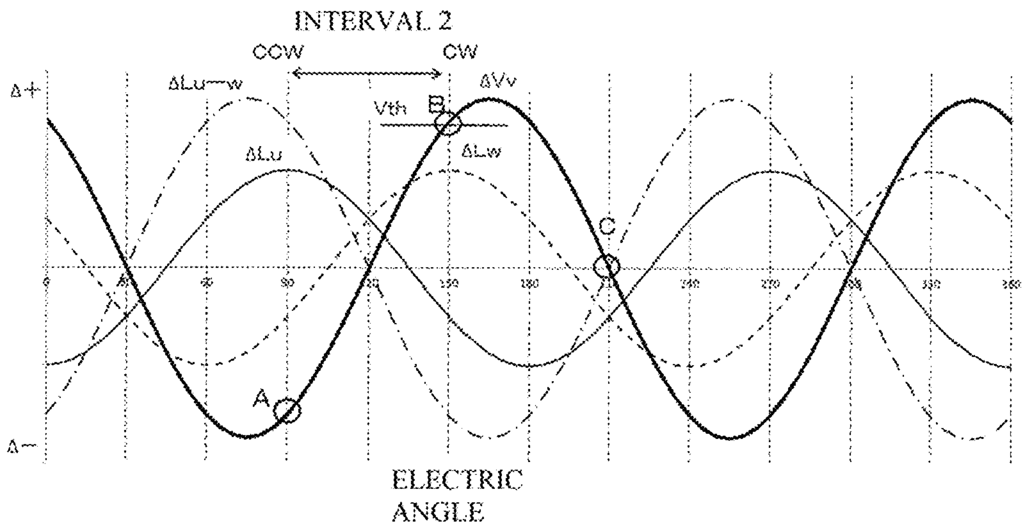
FIG. 2 is a waveform diagram of inductance and non-energization phase coil voltage at the time of U-W excitation.

FIG. 2 illustrates inductance change and a change in non-energization phase coil voltage at the time of U-W excitation. The waveform is obtained by 60° shifting and polarity inversion from the waveform in FIG. 1, and has the V phase as the non-energization phase and the electric angle 210° as the setup position C point.

In a case of CW direction rotation with the position being in interval 2, the non-energization phase coil voltage definitely passes through the B point. At that point, the rotor position is electric angle 150°, and by switching to interval 3 in response to the detection of B point, continuous rotation can be attained.

The V-W excitation is selected for interval 3 from electric angle 150° to electric angle 210°.

Figure 3:
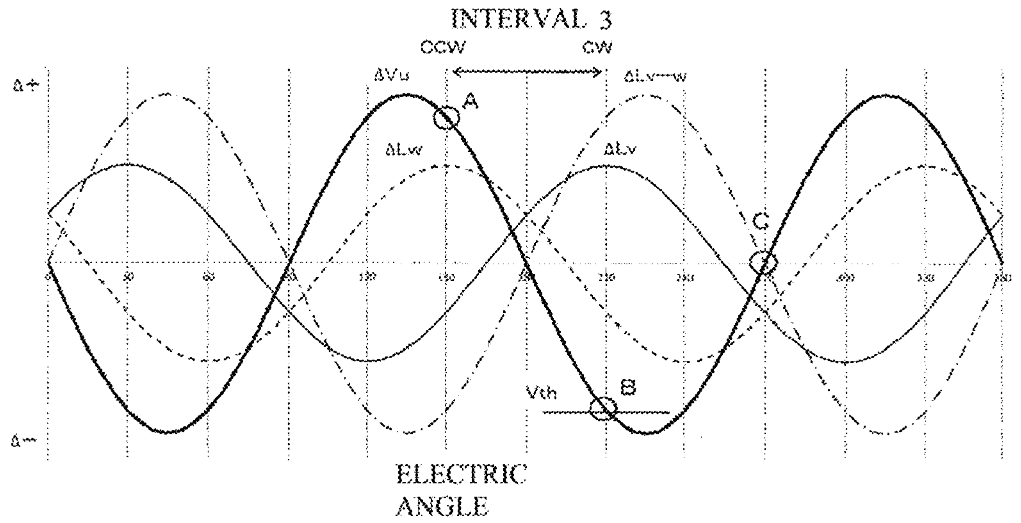
FIG. 3 is a waveform diagram of inductance and non-energization phase coil voltage at the time of V-W excitation.

FIG. 3 illustrates an inductance change and a change in non-energization phase coil voltage at the time of V-W excitation. The waveform is obtained by 60° shifting and polarity inversion from the waveform in FIG. 2, and has the U phase as the non-energization phase and the electric angle 270° as the setup position C point.

In a case of CW direction rotation with the position being in interval 3, the non-energization phase coil voltage definitely passes through the B point. At that point, the rotor position is electric angle 210°, and by switching to interval 4 in response to the detection of B point, continuous rotation can be attained.

The V-U excitation is selected for interval 4 from electric angle 210° to electric angle 270°.

FIG. 4 illustrates inductance change and a change in non-energization phase coil voltage at the time of V-U excitation. The waveform is obtained by 60° shifting and polarity inversion from the waveform in FIG. 3, and has the W phase as the non-energization phase and the electric angle 330° as the setup position C point.

In a case of CW direction rotation with the position being in interval 4, the non-energization phase coil voltage definitely passes through the B point. At that point, the rotor position is electric angle 270°, and by switching to interval 5 in response to the detection of B point, continuous rotation can be attained.

The W-U excitation is selected for interval 5 from electric angle 270° to electric angle 330°.

Figure 5:
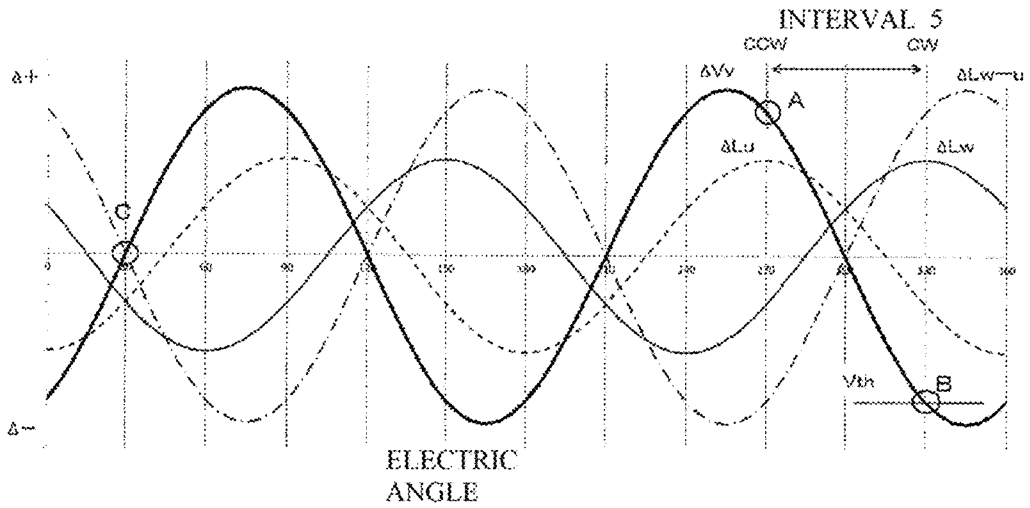
FIG. 5 is a waveform diagram of inductance and non-energization phase coil voltage at the time of W-U excitation.

FIG. 5 illustrates inductance change and a change in non-energization phase coil voltage at the time of W-U excitation. The waveform is obtained by 60° shifting and polarity inversion from the waveform in FIG. 4, and has the V phase as the non-energization phase and the electric angle 30° as the setup position C point.

In a case of CW direction rotation with the position being in interval 5, the non-energization phase coil voltage definitely passes through the B point. At that point, the rotor position is electric angle 330°, and by switching to interval 6 in response to the detection of B point, continuous rotation can be attained.

The W-V excitation is selected for interval 6 from electric angle 330° to electric angle 30°.

Figure 6:
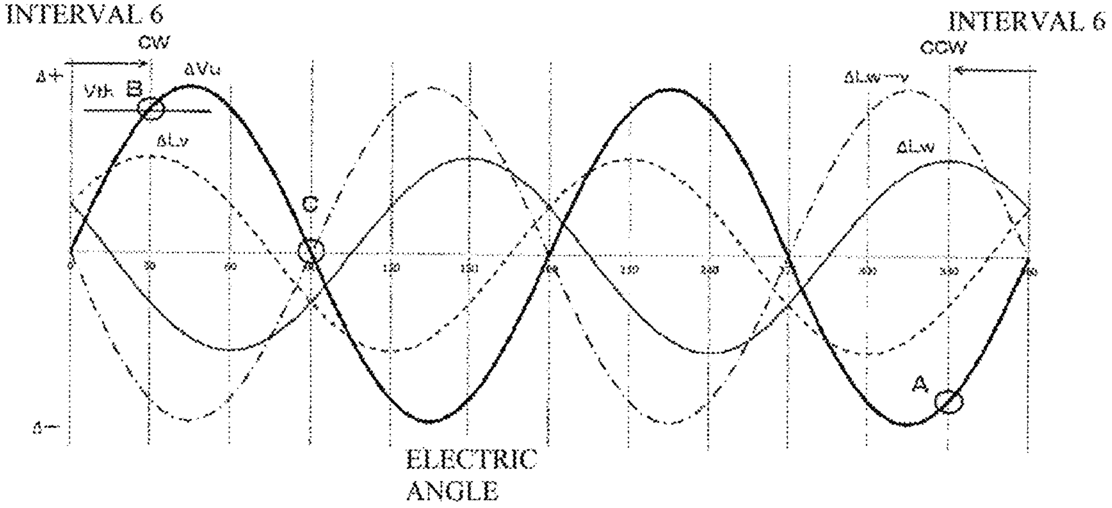
FIG. 6 is a waveform diagram of inductance and non-energization phase coil voltage at the time of W-V excitation.

FIG. 6 illustrates inductance change and a change in non-energization phase coil voltage at the time of W-V excitation. The waveform is obtained by 60° shifting and polarity inversion from the waveform in FIG. 5, and has the U phase as the non-energization phase and the electric angle 90° as the setup position C point.

In a case of CW direction rotation with the position being in interval 6, the non-energization phase coil voltage definitely passes through the B point. At that point, the rotor position is electric angle 30°, and by switching to interval 1 in response to the detection of B point, continuous rotation can be attained.

As described above, the interval end point in the peak portion or the bottom portion adjacent to the setup position can be detected by using the threshold set in advance. The continuous rotation can be attained by incrementing and decrementing the interval number by one respectively at the time of CW direction rotation and at the time of CCW direction rotation, when the non-energization phase coil voltage exceeds the threshold.

As described above, CW indicates the rotation direction in which the interval number increases, and CCW indicates the rotation direction in which the interval number decreases. The interval start point position is a boundary point for the adjacent negative (−) side interval at the time of CW and for the adjacent positive (+) side interval at the time of CCW. For example, in the case of energization interval 1, the position is boundary point 30° for energization interval 6 at the time of CW, and is boundary point 90° for energization interval 2 at the time of CCW.

In FIG. 1, the interval start point at the time of CW direction rotation with U-V energization is illustrated as A point. During the normal operation, rotation occurs in a desired rotation direction, and thus the interval start point needs not to be detected. The start point needs to be detected for appropriate excitation switching at the time of low-speed rotation due to external force in a direction opposite to the desired rotation direction. At the time of high-speed rotation, deceleration is required through braking, and it is conceivable that the start point position is detected only at the time of low-speed rotation.

At the time of rotation in the opposite direction, the induced voltage is problematic. In FIG. 1, the induced voltage in the non-energization phase W has the zero-crossing point at the electric angle 60° position which is the center of the interval. The rotation in the forward rotation direction leads to the slope due to the inductance change and the slope of the induced voltage matching, and thus the interval end point can be reliably detected. On the other hand, the reverse direction rotation leads to the slopes being opposite to each other, meaning that the waveforms produced by the inductance change cancel each other, resulting in difficulty in detection of interval start point. In a case of the motor in which a single cycle form is obtained due to the magnetic saturation, the interval start point is almost impossible to detect.

In view of this, a description will be given focusing on the setup position C point of the W-U excitation in FIG. 5. The C point passes through the electric angle 30°. Thus, the neutral point potential is compared with the non-energization phase V phase voltage $\Delta Vv$. The rotation toward the interval 6 side beyond the electric angle 30° can be detected when $\Delta Vv$ falls below the neutral point potential.

Thus, during the U-V excitation in interval 1, by temporarily switching to the W-U excitation and measuring the non-energization phase V phase voltage, whether the passing through the electric angle 30° has occurred or has not occurred yet can be determined. By periodically repeating the measurement until the passing through the electric angle 30° occurs, the interval start point, that is, excitation switching position can be detected.

The detection of the interval start point electric angle 90° at the time of CCW direction rotation is similar to that in the case of the CW direction rotation. Specifically, with reference to FIG. 6, the electric angle 90° position can be detected by performing the W-V excitation and measuring the non-energization phase U phase voltage.

Before and after the electric angle 30° or the electric angle 90° that is the setup position, a slope of the voltage change is steep and positive or negative can be easily determined. Furthermore, phase shift is small. Thus, the position can be reliably detected. The sensing cycle is preferably set to be long, because a slight amount of power is consumed for the sensing.

Similarly, for energization intervals 2 to 6, by selecting the energization pattern as the setup point, and periodically measuring the inductance zero-crossing point, the interval start point can be detected. The detection of the start point means that the reverse direction rotation is in occurring, and thus, the continuous rotation can be attained by decrementing the interval number.

In a case where the rotor is rotating at an extremely low speed in the reverse rotation direction opposite to the desired rotation direction due to external force, the detection of the interval start point and the excitation switching are required for resuming the forward rotation. The interval start point can be detected by setting the start point threshold.

For example, in FIG. 1, the start point threshold may be an A point potential, when the position is in interval 1. Similarly, the start point threshold may be the A point potential in each of intervals 2 to 6 in FIGS. 2 to 6. Thus, a start point threshold Vth2 with a predetermined potential difference from the neutral point potential is set in advance, and the non-energization phase coil voltage $\Delta V$ is compared with the start point threshold Vth2 for each measurement. Exceeding of the interval start point can be detected when the start point threshold is exceeded. Furthermore, the slope of the non-energization phase coil voltage $\Delta V$ can be determined, and the reverse rotation state can be detected when the slope is opposite to that in the forward rotating state.

Thus, when the start point is detected while the rotor is in the reverse rotation state, by performing excitation with the excitation interval returned to the immediately preceding interval, the forward rotation torque is produced, that is, brake is applied, whereby the reverse rotation is suppressed, and the forward rotation can be resumed.

However, the polarity of the induced voltage at the time of reverse rotation is opposite to that in the case of forward rotation. Thus, the non-energization phase coil voltage $\Delta V$ at the interval start point is lower than that in the case of the forward rotation, and does not exceed the start point threshold Vth2. In this case, the start point threshold Vth2 can be corrected with the induced voltage estimated through calculation. Alternatively, the start point may be detected only at the time of extremely low-speed rotation during which the error by the induced voltage is ignorable.

With this method, the start point can be detected in the driving excitation state without performing special excitation for field magnet position detection. Thus, the energization efficiency is not compromised, and no electromagnetic sound is produced by sensing energization. Furthermore, by detecting the start point, the brake can be applied from the reverse rotation state, to resume the forward rotation.

A change in the non-energization phase coil voltage is caused by the inductance in the stopped state, and the induced voltage is superimposed thereon when the rotor rotates. In a case of PWM control, the induced voltage largely changes when the duty ratio is changed, and the field magnet position may be difficult to detect in the measurement interval. Thus, the following field magnet position detection method for an electric motor is employed.

When the operation is performed with the rotation of the rotor 2 accelerated while varying the duty ratio of the predetermined driving voltage applied to the three-phase coil, the optimum duty ratio for sensing the non-energization phase coil voltage is selected for the on-duty interval, and the driving voltage is applied with the on-duty interval in an energization interval of a single cycle divided into a plurality of on-duty intervals including the optimum duty ratio.

Figure 10A:
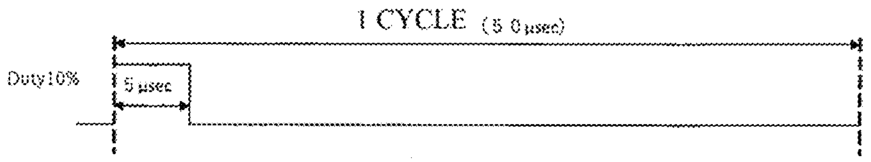
FIGS. 10A and 10B are waveform diagrams of driving voltage for each duty ratio in an energization interval corresponding to two cycles in a timing chart of 120-degree energization.
Figure 10B:
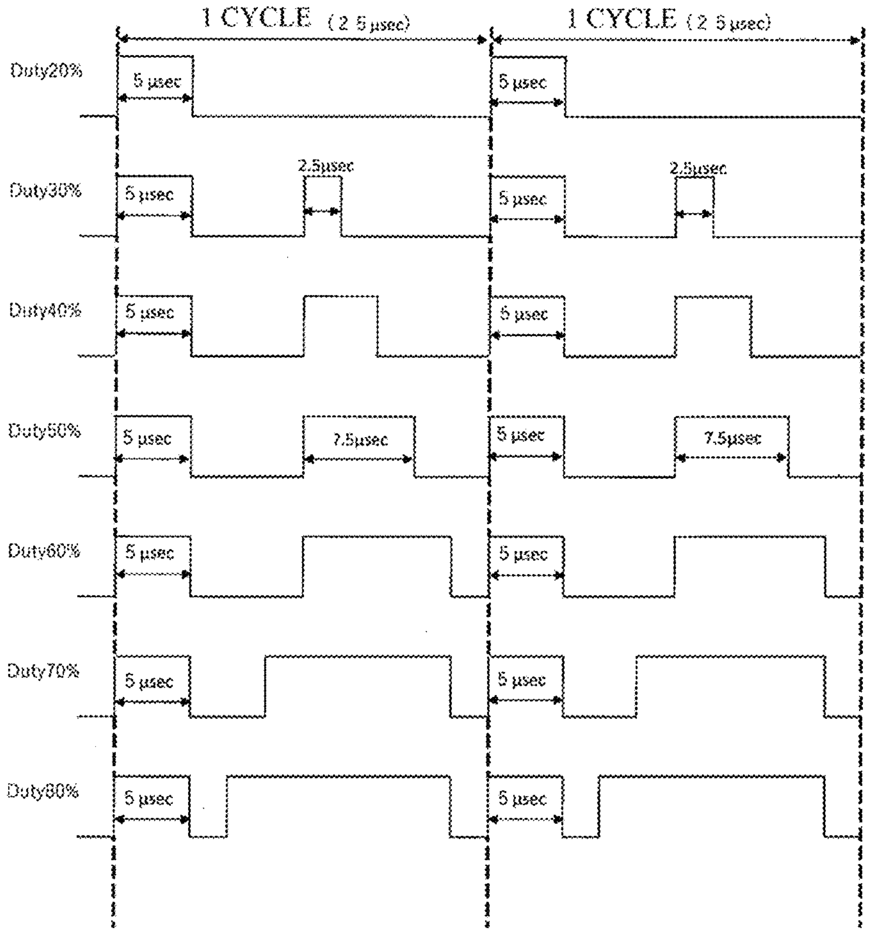

FIGS. 10A and 10B to FIGS. 11A and 11B are each a driving voltage waveform diagram for each duty ratio in the energization interval of two cycles in a timing chart for 120-degree energization. As illustrated in FIGS. 10A and 10B, the MPU 51 selects a duty ratio (optimum duty ratio that is 20% for example) suitable for sensing, enabling detection of the non-energization phase coil voltage for the on-duty interval in the energization interval of a single cycle through the invertor circuit 52, and when applying the driving voltage based on the duty ratio exceeding this optimum duty ratio, divides the on-duty interval of a single cycle into a plurality of energization intervals including the optimum duty ratio, and applies the driving voltage. When the driving voltage based on a duty ratio not higher than the optimum duty ratio is applied, the driving voltage including the optimum duty ratio in a single cycle with an extended duration or in a plurality of cycles is applied.

A specific example will be described. A predetermined driving voltage with a duty ratio 20% illustrated in FIG. 10B is assumed to be the optimum duty ratio suitable for sensing enabling detection of the non-energization phase coil voltage. For example, when a single cycle of the PWM control is 25 μsec, the on-duty interval corresponding to the optimum duty ratio 20% is 5 μsec. This on-duty interval which is 5 μsec is hereinafter referred to as the optimum on-duty interval. The predetermined driving voltage is applied in the optimum on-duty interval with other duty ratios, whereby measurement of a change in the induced voltage on the positive and the negative sides occurring in the non-energization phase coil is facilitated even when the duty ratio is different from the optimum duty ratio.

First of all, an example of a case where the motor is driven at a duty ratio 10% lower than the optimum duty ratio 20% will be described. As described above, assuming that the optimum on-duty interval is 5 μsec with the optimum duty ratio being 20%, the on-duty interval is 2.5 μsec when the duty ratio is 10% with the duration of a single cycle being the same, that is, 25 μsec. Then, the driving voltage cannot be applied with the optimum on-duty interval 5 μsec. Thus, as illustrated in FIG. 10A, the driving voltage is applied including the optimum on-duty interval 5 μsec in the case of the optimum duty ratio 20%, with the duration of a single cycle doubled from 25 μsec to be 50 μsec, whereby the duty ratio 10% is achieved. While an example of extending the duration of a single cycle is illustrated in FIG. 10A, the duty ratio may be achieved by applying the driving voltage including the optimum on-duty interval 5 μsec at the optimum duty ratio 20% in a plurality of cycles. For example, when the duty ratio is achieved with two cycles, a control operation may be repeated, in which the driving voltage is applied at the duty ratio 20% with the optimum on-duty interval 5 μsec in the first cycle, and then the driving voltage is set to zero in the second cycle.

Next, an example where the motor is driven with a duty ratio exceeding the optimum on-duty interval 5 μsec corresponding to the duty ratio 20% optimum for the sensing will be described. In this case, the driving voltage is applied in the on-duty interval of a single cycle divided into a plurality of on-duty intervals for the driving voltage including the on-duty interval 5 μsec corresponding to the optimum duty ratio 20%, and for the driving voltage with the on-duty interval based on a duty ratio exceeding the optimum duty ratio 20%. For example, when the motor is driven with the duty ratio raised to 30% from the optimum duty ratio 20%, the driving voltage is applied in the optimum on-duty interval 5 μsec including the optimum duty ratio 20% in an energization interval of a single cycle, and then, after an off-duty interval, the driving voltage is applied with the on-duty interval 2.5 μsec corresponding to the duty ratio 10% which is an excess amount from the optimum duty ratio 20%. Specifically, the on-duty interval is 7.5 μsec which is a sum of the optimum on-duty interval 5 μsec and the on-duty interval 2.5 μsec which is an excess amount from the optimum on-duty interval 5 μsec. Since a single cycle is 25 μsec, the on-duty interval 7.5 μsec, which is a sum, corresponds to the duty ratio 30%.

When the motor driving is controlled with the duty ratio raised to 50%, the driving voltage is applied in the optimum on-duty interval 5 μsec including the optimum duty ratio 20% in the energization interval of a single cycle, and then, after the off-duty interval, the driving voltage is applied in the on-duty interval 7.5 μsec corresponding to the duty ratio 30%. The on-duty interval may be divided into two or more intervals in the energization interval of a single cycle.

The off-duty interval is assumed to be always provided after the end of a single cycle of the PWM driving. For example, when the driving is controlled with the duty ratio 50% described above, after the optimum on-duty interval 5 μsec, the off-duty interval, the on-duty interval 7.5 μsec, and the off-duty interval, the next single cycle starts. This is for facilitating the control with the range of a single cycle clarified.

When the duty ratio of the driving voltage for the PWM energization on the three-phase coil of a motor that performs sensorless driving is varied as described above, the field magnet position of an electric motor can be detected in a low-speed driving period from the non-energization phase coil voltage in the energization interval based on the on-duty interval (5 μsec for example) corresponding to the optimum duty ratio (20% for example) with any of controllable duty ratios selected. Thus, a smooth continuous operation of the electric motor can be attained in a low speed range.

Figure 11A:
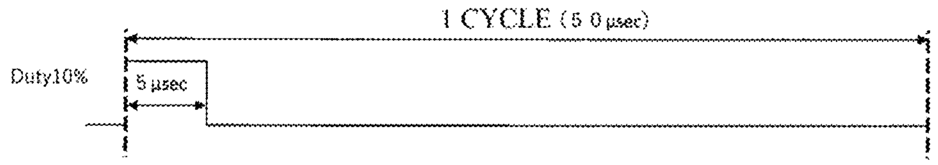
FIGS. 11A and 11B are waveform diagrams of driving voltage for each duty ratio in an energization interval corresponding to two cycles in a timing chart of 120-degree energization.
Figure 11B:
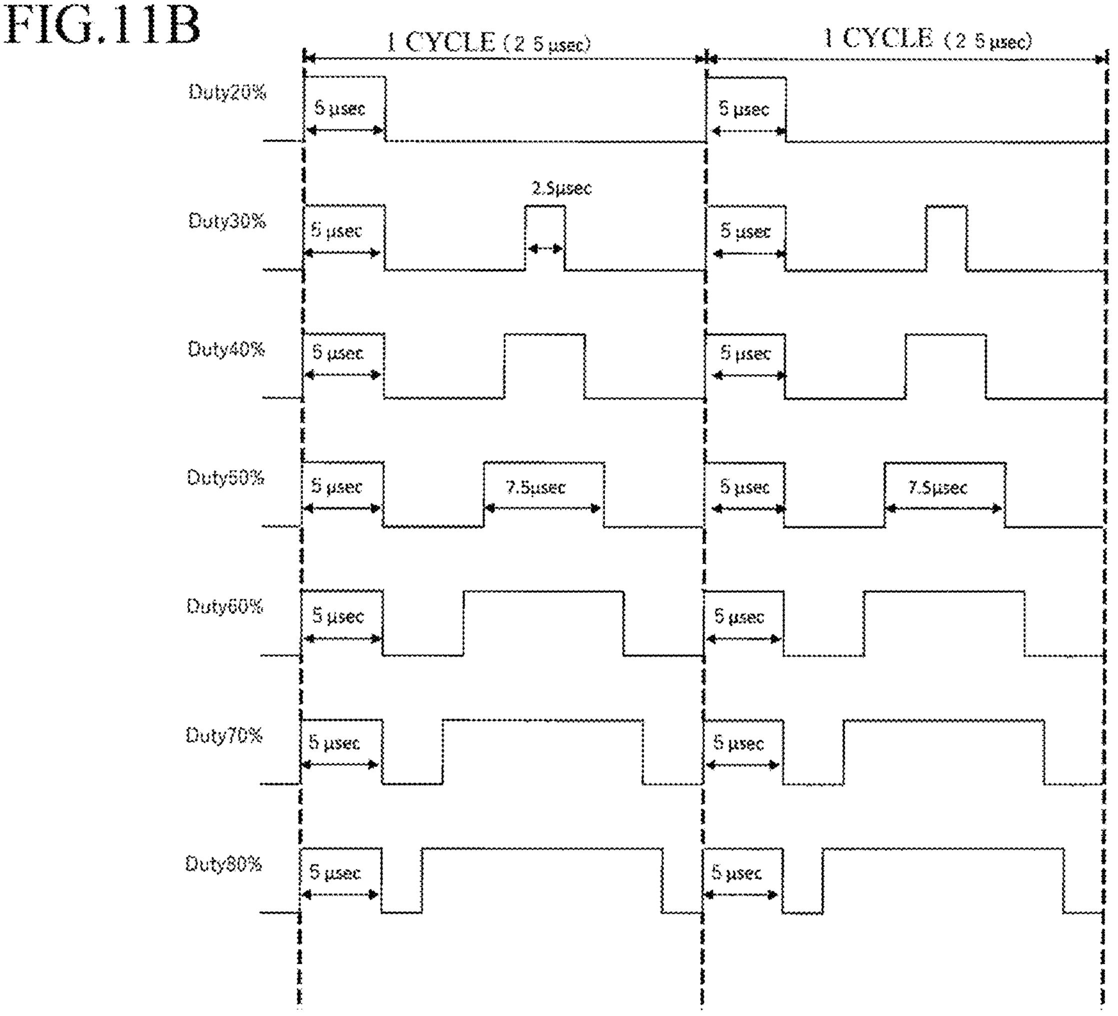
Figure 12:
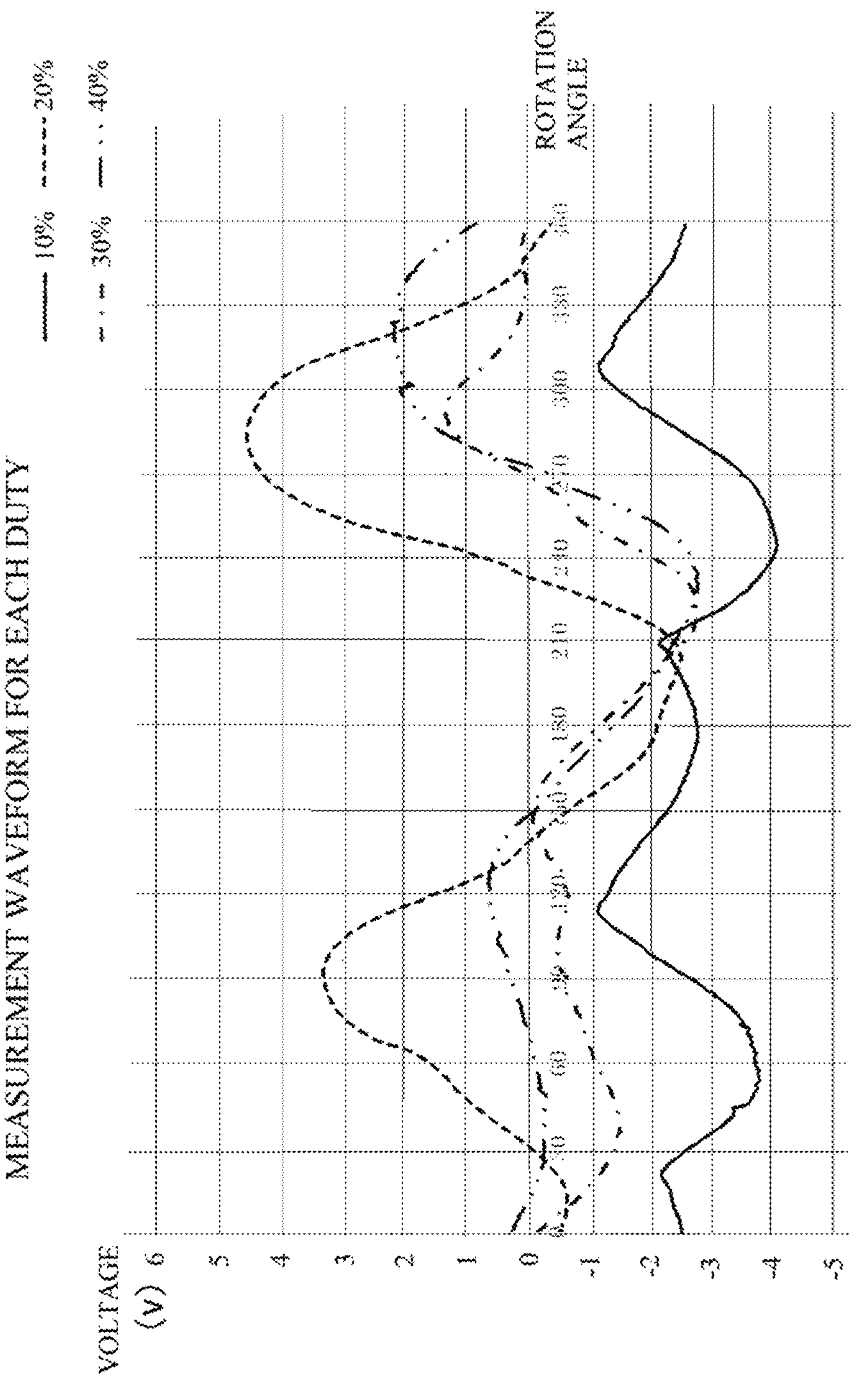
FIG. 12 is a waveform diagram of induced voltage induced by non-energization phase coil voltage in a case where the duty ratio under PWM driving is varied.
Figure 13:
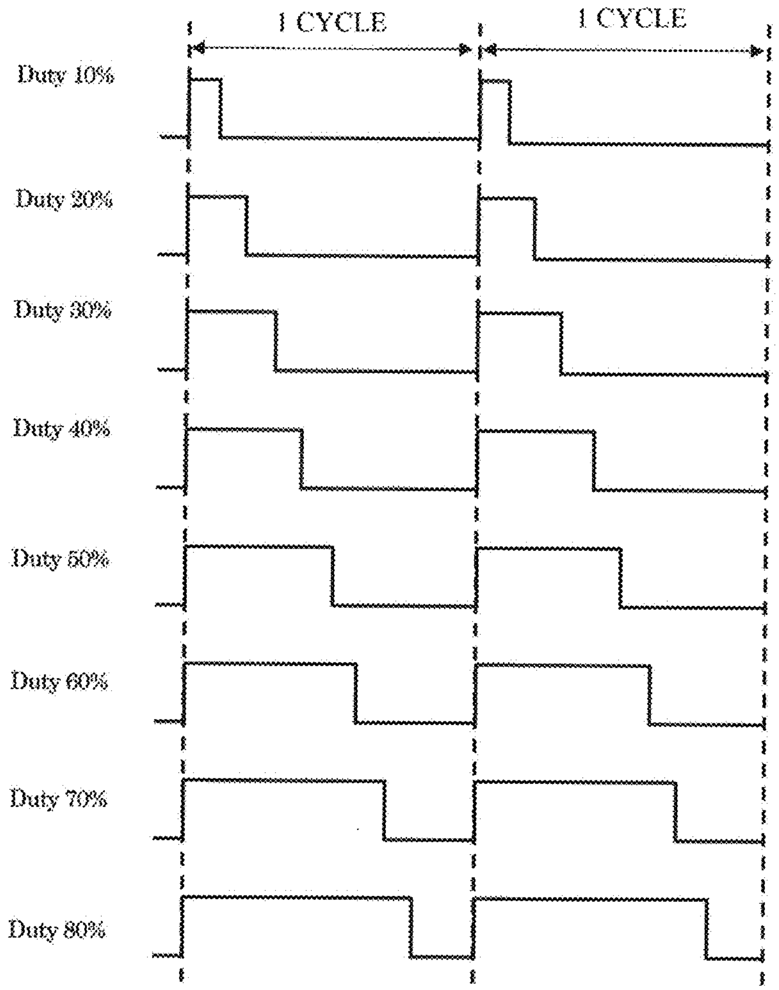
FIG. 13 is a waveform diagram of driving voltage in a case where the duty ratio under the PWM driving is varied.

The driving voltage waveform diagrams in FIG. 10B and FIG. 11B are different from each other in a timing of applying the driving voltage in the remaining on-duty interval applied after the driving voltage based on the optimum on-duty ratio (20% for example) enabling detection of the non-energization phase coil voltage, in the energization interval of a single cycle. FIG. 10B illustrates an example where the driving voltage is applied in the on-duty interval which is an excess amount from the optimum on-duty interval, with a long off-duty interval provided after the application of the driving voltage based on the optimum on-duty interval (5 μsec for example) corresponding to the optimum on-duty ratio (20% for example). FIG. 11B illustrates an example where the driving voltage based on the optimum on-duty interval (5 μsec for example) corresponding to the optimum on-duty ratio (20% for example) is applied, with the off-duty intervals before and after the application of the driving voltage in the on-duty interval which is an excess amount from the optimum on-duty interval set to be equal to each other.

For the driving voltage applied to the three-phase coil, the field magnet position is preferably detected for the electric motor with the duty ratio varied between 10% and 80%. This is because, when the duty ratio falls below 10% or exceeds 80%, the field magnet position is difficult to detect for an electric motor, because a change in induced voltage is difficult to identify due to a short off-duty interval in the energization interval of a single cycle.

Thus, even when the duty ratio of the driving voltage applied to the coil of the motor is largely varied, a low-speed operation can be performed while detecting the field magnet position of the electric motor, whereby the controllability of the electric motor is improved.

An example of a field magnet position detection operation at the time of the activation by the MPU 51 will be described below. First of all, the detection operation at the time of forward rotation will be described. The threshold Vth is set as appropriate in advance. The initial speed and the rotation direction are measured. Normally, stop is detected. Transition to a rotation operation occurs when the rotation is detected. The initial position is detected by any method when stop is detected. For example, it is assumed that the result indicates that the position is in interval 1. The energization under the excitation pattern U-V suitable for the CW rotation in energization interval 1 is selected.

In FIG. 8, the ADC 53 performs A/D conversion on the three-phase coil voltage during the on cycle with the U-V energization performed only for a single pulse under the PWM control from the invertor circuit 52. The MPU 51 obtains the neutral point potential by (U phase voltage+V phase voltage)/2. Next, whether non-energization phase W phase voltage−neutral point potential exceeds Vth is determined. When the threshold is not exceeded, the PWM control is resumed and the energization and the measurement are repeated. When the threshold is exceeded, the interval number is incremented/decremented since it indicates the interval end point. Thereafter, as in energization interval 1, the excitation pattern is selected, and the continuous rotation is implemented with the energization repeated under the PWM control.

When the duty ratio of the driving voltage for accelerating the motor is raised over the optimum duty ratio (20% for example) for detecting the non-energization phase W phase coil voltage, the energization interval of a single cycle of the PWM energization is divided into a plurality of on-duty intervals including the optimum duty ratio (20% for example) and the driving voltage is applied. For example, when the driving control is performed with the duty ratio 50%, the driving voltage is applied with the duty ratio 20% in the energization interval of a single cycle, and then, after the off-duty interval, the driving voltage is applied at the duty ratio 30%.

While the case where an operation of accelerating the motor from the low-speed rotation is described in the example above, the same applies to the operation of decelerating the motor to the low-speed rotation.

What is claimed is:

1. A field magnet position detection method for an electric motor including a rotor including a permanent magnet field system, a stator including a three-phase coil, an output unit configured to perform bidirectional energization on the three-phase coil via a half bridge type invertor circuit, a control unit configured to perform PWM control on a coil output in response to an instruction from a host controller, store energization angle information and energization pattern information in units of 60° energization interval in which continuous rotation is attainable, and switch an energization state by performing switching control on the output unit based on the information, and a measurement unit configured to perform A/D conversion on the three-phase coil voltage and transmit resultant voltage to the control unit, the method comprising, using the electric motor and by the control unit:

performing 120-degree energization including an off cycle periodically in an energization pattern in which a point of self-excited stop occurring with two-phase fixed energization through the output unit matches a start point position of the 60° energization interval; and performing sensorless driving while detecting a field magnet position of the electric motor by measuring energization phase voltage and non-energization phase voltage in an on cycle of the PWM energization with the measurement unit, wherein the control unit selects an optimum duty ratio for sensing the non-energized phase coil voltage during the on-duty period and operates by varying the duty ratio of the predetermined drive voltage applied to the three-phase coil through the output unit, and when driving with the optimum duty ratio during a current conduction period of one cycle, the predetermined drive voltage is applied through the output unit during the on-duty period of the optimum duty ratio, and when driving with a duty ratio exceeding the optimum duty ratio during a current conduction period of one cycle, the predetermined drive voltage is applied through the on-duty period of one cycle dividing into a plurality of on-duty periods including the optimum duty ratio.

2. A field magnet position detection method for an electric motor including a rotor including a permanent magnet field system, a stator including a three-phase coil, an output unit configured to perform bidirectional energization on the three-phase coil via a half bridge type invertor circuit, a control unit configured to perform PWM control on a coil output in response to an instruction from a host controller, store energization angle information and energization pattern information in units of 60° energization interval in which continuous rotation is attainable, and switch an energization state by performing switching control on the output unit based on the information, and a measurement unit configured to perform A/D conversion on the three-phase coil voltage and transmit resultant voltage to the control unit, the method comprising, using the electric motor and by the control unit:

performing 120-degree energization including an off cycle periodically in an energization pattern in which a point of self-excited stop occurring with two-phase fixed energization through the output unit matches a start point position of the 60° energization interval; and performing sensorless driving while detecting a field magnet position of the electric motor by measuring energization phase voltage and non-energization phase voltage in an on cycle of the PWM energization with the measurement unit, wherein the control unit selects an optimal duty ratio for sensing the non-energized phase coil voltage during the on-duty period and operates by varying the duty ratio of the predetermined drive voltage applied to the three-phase coil through the output unit, and when driving with the optimal duty ratio during the energization period of one cycle, applies the predetermined drive voltage during the on-duty period of the optimal duty ratio, and when driving with a non-exceed the optimal duty ratio during the energization period of one cycle, applies the predetermined drive voltage during extends the time of the energization period of one cycle or during multiple cycles including the optimal duty ratio.

* * * * *